United States Patent
Wallstedt et al.

(10) Patent No.: US 6,330,450 B1
(45) Date of Patent: Dec. 11, 2001

(54) DETECTING AND MINIMIZING THE EFFECTS OF TRANSMITTER NOISE ON SIGNAL STRENGTH MEASUREMENT IN A WIRELESS COMMUNICATION SYSTEM

(75) Inventors: Kenneth Wallstedt, Chapel Hill; Torbjorn Ward, Cary, both of NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/236,249

(22) Filed: Jan. 25, 1999

(51) Int. Cl.$^7$ ..................................................... H04Q 7/20
(52) U.S. Cl. .................... 455/447; 455/115; 455/405; 455/63; 455/423
(58) Field of Search .................................. 455/67.1, 67.3, 455/115, 132, 134, 135, 226.1, 226.2, 226.3, 450, 447, 296, 295, 511, 437, 405, 63, 423, 424, 425

(56) References Cited

U.S. PATENT DOCUMENTS

| | | | |
|---|---|---|---|
| 4,481,670 | * | 11/1984 | Freeburg ................................ 455/33 |
| 5,038,399 | * | 8/1991 | Bruckert ................................. 455/33 |
| 5,175,867 | * | 12/1992 | Wejke et al. .......................... 455/33.1 |
| 5,551,064 | * | 8/1996 | Nobbe et al. ............................ 455/62 |
| 5,564,090 | * | 10/1996 | Beauchamp et al. ................. 455/220 |
| 5,596,571 | * | 1/1997 | Gould et al. .......................... 370/335 |
| 5,740,531 | * | 4/1998 | Okasa .................................... 455/403 |
| 5,867,766 | * | 2/1999 | Dinc et al. .............................. 455/62 |
| 5,963,865 | * | 10/1999 | Desgagne et al. .................... 455/450 |
| 5,982,531 | * | 11/1999 | Kane et al. ............................. 381/13 |
| 6,011,970 | * | 8/1996 | McCarthy ............................. 455/436 |
| 6,064,890 | * | 5/2000 | Hirose et al. ......................... 455/513 |

FOREIGN PATENT DOCUMENTS

WO95/22876 * 8/1995 (EP) ................................ H04Q/7/38

9522876  8/1995  (WO) .

OTHER PUBLICATIONS

"Radio Resource Management In A Novel Indoor GSM Base Station System", Silventoinen, M.I. et al. The 8$^{th}$ IEEE InterP national Symposium on Personal, Indoor and Mobile Radio Communications, 1997.

"Autonomous Adaptive Frequency Assignment For TDMA Portable Radio Systems",Chuang. J. C. IEE Transactions on Vehicular Technology, Published Aug. 1, 1991.

* cited by examiner

Primary Examiner—William Trost
Assistant Examiner—Congvan Tran
(74) Attorney, Agent, or Firm—Wood, Phillips, VanSanten, Clark & Mortimer

(57) ABSTRACT

A system and method for minimizing effects of both internal and external transmitter noise in order to improve control decisions that are based on signal strength measurements. A wireless network includes an internal transmitter transmitting a first signal at a first frequency and noise at other frequencies in a known pattern. The signal strength of the first signal is measured by the receiver at the first frequency. The noise of the transmitter of the first signal is calculated on other frequencies, using the first transmitter's known noise pattern. A determination is then made whether the noise of the first signal is above a threshold on one or more of the other frequencies used by the wireless communication system. If the noise is above the threshold, corrective action is taken. The wireless network further includes one or more receivers that measure signal strengths on the range of frequencies used by the system. A correlation is made between the known spectral pattern of transmitters external to the system and the signal strength measurements. If the correlation is above a threshold, then external noise is present and corrective action is taken.

44 Claims, 13 Drawing Sheets

DETECTING AND MINIMIZING THE EFFECTS OF TRANSMITTER NOISE ON SIGNAL STRENGTH MEASUREMENT IN A WIRELESS COMMUNICATION SYSTEM

FIELD OF THE INVENTION

This invention relates to the field of wireless communications, and, more specifically, to a wireless communication system that bases control decisions on signal strength measurements.

BACKGROUND OF THE INVENTION

Some wireless communication systems base control decisions (such as handoff decisions, allocation of channels, allocation of frequencies and management of other resources) on signal strength measurements. In mobile assisted handoff, for example, each mobile station periodically measures the strengths of signals from its serving base station and from surrounding base stations. The mobile station reports these measurements to the wireless communication system. The wireless communication system determines from these signal strength measurements whether a handoff to another base station is necessary and which base station should the mobile be handed off to. Such signal strength based control decisions may be incorrect because of interference, such as noise, from sources internal and external to the wireless system.

All transmitters generate noise; that is, energy at frequencies other than the assigned operating frequency. A transmitter's noise can cause an erroneous signal strength measurement when the transmitter's noise at a particular frequency is greater than the signal strength of another transmitter assigned to that frequency. Erroneous measurements may result in incorrect control decisions, such as an unnecessary mobile station handoff or the allocation of a channel that cannot sustain a call.

SUMMARY OF THE INVENTION

The present invention provides a system and method for minimizing interference of internal and external transmitter noise to improve control decisions that are based on signal strength measurements. This invention operates in a wireless communications system that uses a plurality of frequencies for communication and that bases control decisions on signal strength measurements. In this wireless communication system, a transmitter internal to the system is transmitting a first signal at a first frequency and noise at other frequencies in a known pattern. The signal strength of the first signal at the first frequency is measured by a receiver. The noise of the transmitter of the first signal is calculated on other frequencies, using the transmitter's known noise pattern. A determination is then made whether the noise of the first signal is above a threshold on one or more of the other frequencies used by the wireless communication system. If the noise is above the threshold, corrective action is taken. Such corrective action includes disregarding the signal strength measurement on the affected frequencies and shutting off the first transmitter.

According to another aspect of this invention, noise from transmitters external to the wireless communication system may be detected by measuring signal strengths at one or more receivers across a range of frequencies and correlating the signal strength measurement to known spectral patterns of transmitters from other systems. If a correlation is above a threshold, then corrective action is taken. Such corrective action includes suspending signal strength measurements at affected frequencies and rebuilding a list of allocable frequencies.

BRIEF DESCRIPTION OF THE DRAWINGS

A more complete understanding of this invention may be obtained from a consideration of the following detailed description in conjunction with the drawings, in which.

DETAILED DESCRIPTION OF THE PREFERRED EMBODIMENT

In many different types of typical wireless communication systems, a receiver makes signal strength measurements of all signals that it receives. Furthermore, the wireless communication system knows each transmitter that is operating within the system (herein "internal" to the system). The system also knows the noise characteristics of each transmitter. The system can thus calculate whether an internal transmitter is generating noise at one or more frequencies that may affect signal strength measurements of such frequencies. If the calculated noise exceeds a threshold, corrective action is taken. This method may be utilized in any wireless system that measures signal strength.

Noise generated by transmitters that are operating on other, nearby systems (herein "external") also can affect signal strength measurements of one or more receivers internal to the system. The system can detect external noise by checking the color code (DVCC) of the signal from the external transmitter, or the system can determine whether the noise is internal or external by checking whether the transmitter is synchronized to the system. Further, the system can gather signal strength measurements over a range of frequencies and correlate these measurements with known transmitter noise patterns from the various systems (i.e., TDMA, analog, CDMA, etc.). If the correlation is above a threshold, then corrective action is taken. Corrective action may include ignoring signal strength measurements on the affected frequencies. If the correlation persists above a threshold for a predetermined time, then corrective action may include changing the frequencies used by the system.

Figure 1:
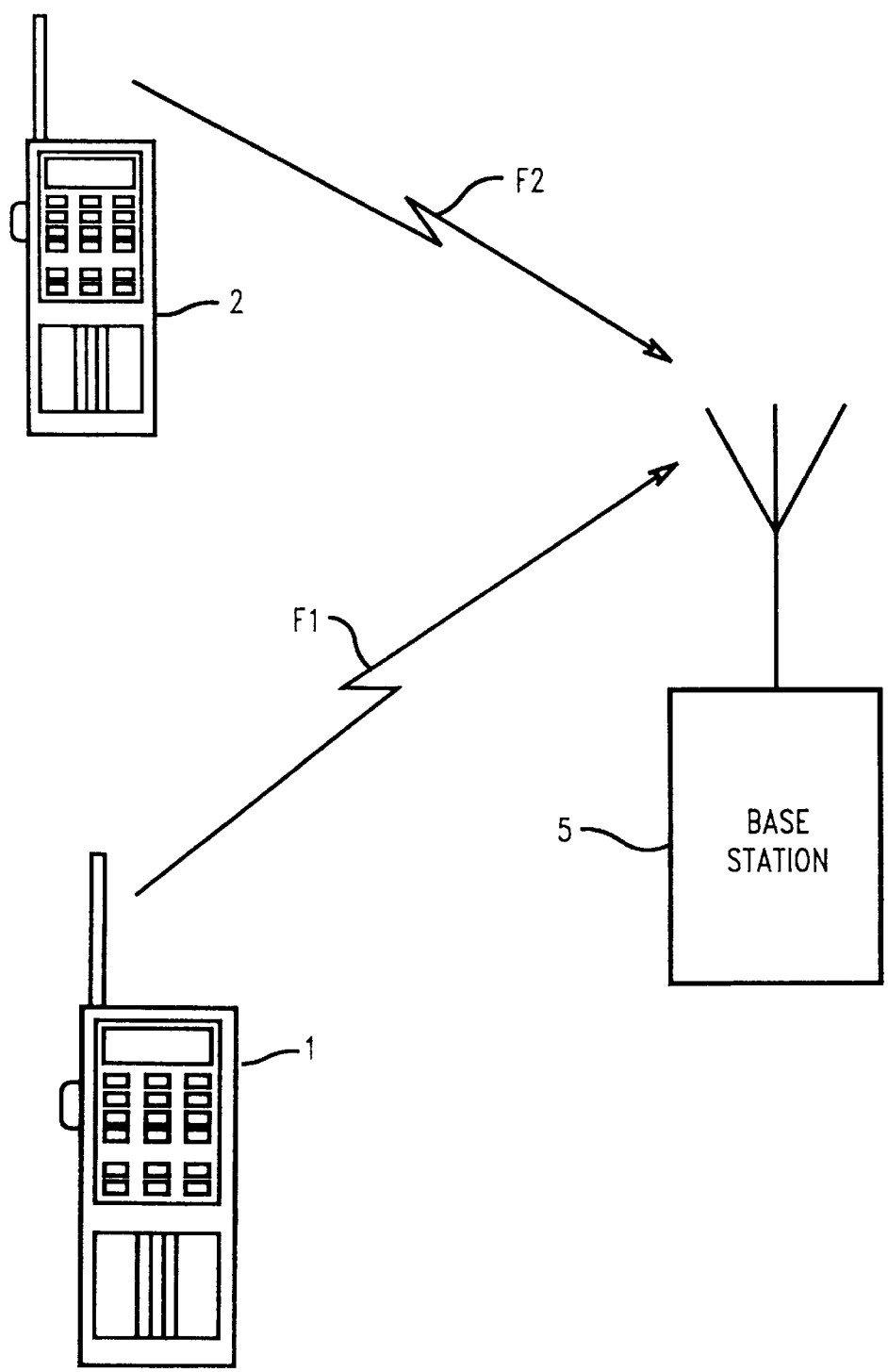
FIG. 1 is a block diagram of a wireless communication system subject to internal transmitter noise interference.

FIG. 1 is an example of a transmitter transmitting a signal on one frequency affecting a signal strength measurement on another frequency, wherein both transmitters 1 and 2 are operating in the same network. In FIG. 1, a mobile station 1 is transmitting a signal on a first frequency, F1. Mobile station 1 is close to the receiving base station 5; thus, the signal strength of mobile station 1 is high at the base station 5. Simultaneously, a mobile station 2 is transmitting a signal to the base station 5 on a second frequency, F2. The mobile station 2 is far from the base station 5 and the received signal strength of mobile station 2 on F2 is low. If the noise from the transmitter of mobile station 1 is stronger on F2 than the signal from mobile station 2, then the base station 5 measures the signal strength of the noise from mobile station 1, not the signal from mobile station 2. In this situation, there is a risk that the signal strength of mobile station 1 will cause improper operation of the system.

Figure 2:
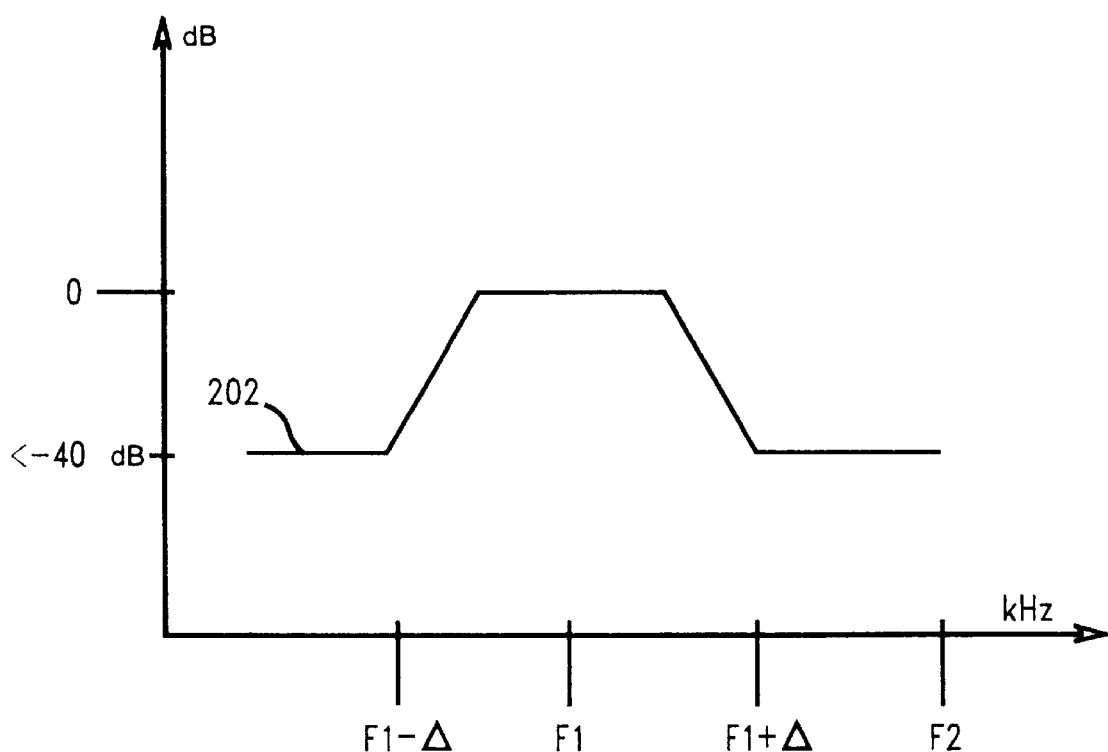
FIG. 2 is a graph of the attenuation characteristics of a typical transmitter filter.

FIG. 2 is an idealized attenuation curve 202 for a transmitter in a wireless communication system. The signal from the transmitter is not attenuated (0 dB) at its assigned frequency of F1. The signal is attenuated sharply to −40 dB, or less, at F1±Δ. The attenuation curve 202 is the ideal, however. Transmitters generate noise on other frequencies, but in a manner that is either known or easily calculated. Once the signal strength at F1 is known, the signal strength of the transmitter's noise at F2 can be calculated. Thus, if the signal strength of the noise of the transmitter on F1 is above a threshold at F2, then corrective action may be taken.

Figure 3:
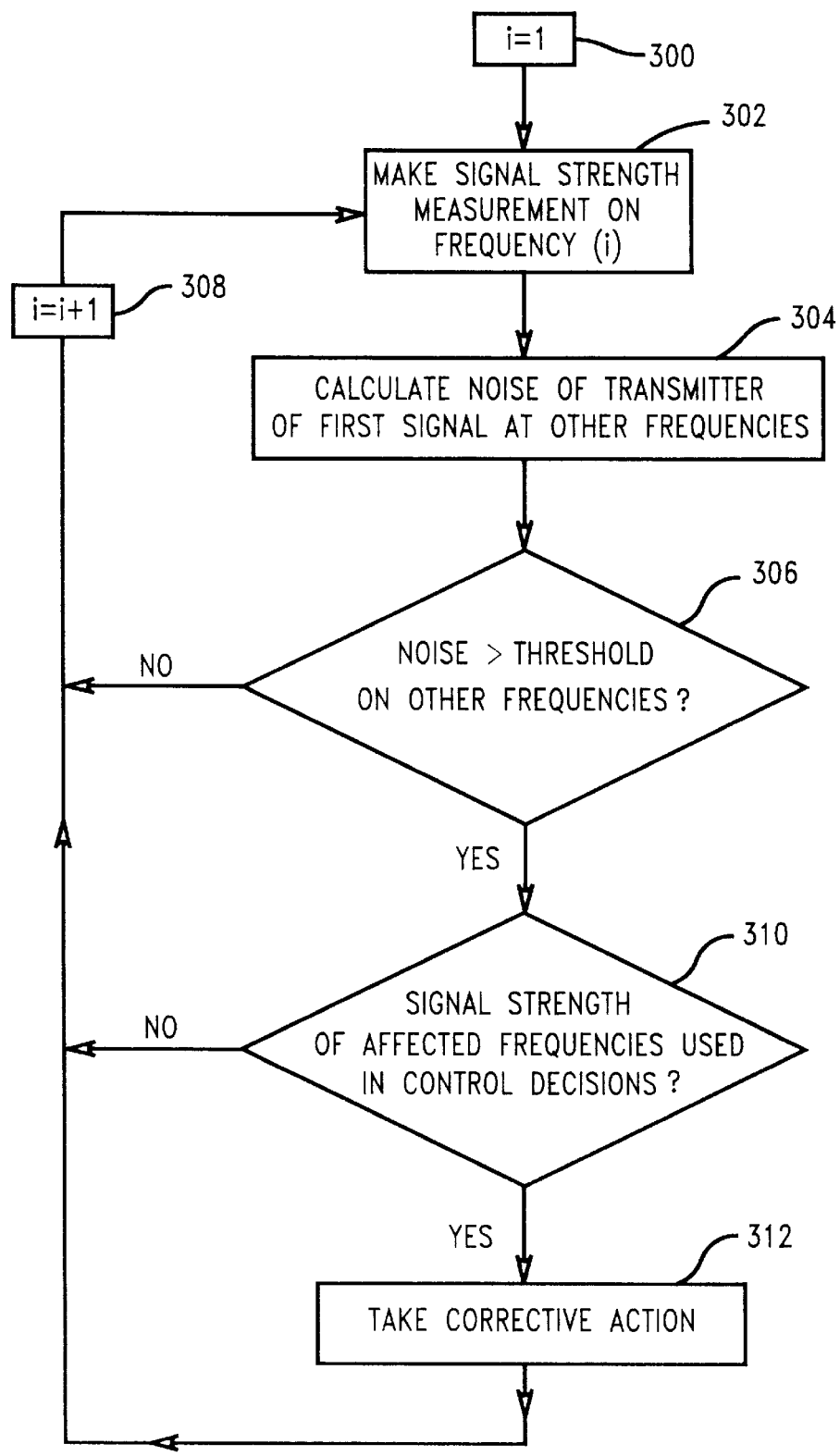
FIG. 3 is a flow diagram of operation.

The general analysis of when to disregard signal strength measurements is illustrated in the flow chart of FIG. 3. At action box 300, a frequency counter is set to the first frequency. In action box 302, a signal strength measurement is made for a signal on that frequency (the first frequency). Processing proceeds to action box 304, where the transmitter's noise is calculated at other frequencies. Processing continues to decision diamond 306, where a decision is made whether the strength of the noise of the transmitter transmitting on the first frequency calculated in action box 304 is above a threshold on any of the other frequencies. If not, then processing proceeds back through box 308, where the frequency is incremented and signal strength of another frequency is measured in action box 302.

If, in the decision diamond 306, the noise of the transmitter is above the threshold at one or more frequencies, then processing moves to decision diamond 310, where a determination is made whether any of the affected frequencies require signal strength measurements for control functions. If there are, then processing continues to box 312 where corrective action is taken. Corrective action may include simply disregarding any signal strength measurements at the affected frequencies or causing the noisy transmitter to stop transmitting. If the signal strength of the affected frequencies is not used in control decisions, then processing loops back through action box 308 to action box 302, and the signal strength of a signal on another frequency is checked.

Figure 4:
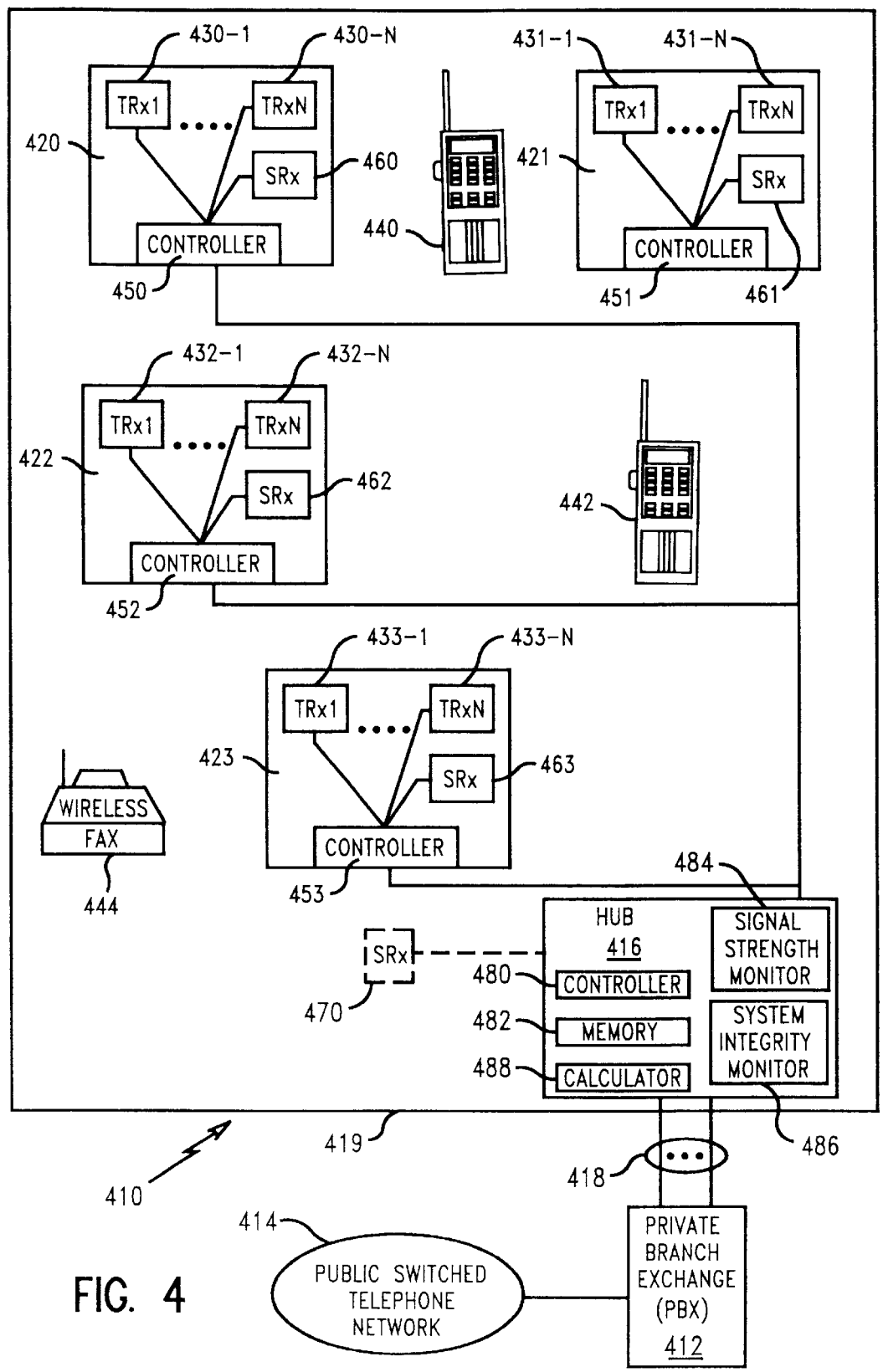
FIG. 4 is a block diagram of a wireless office that employs a scanning receiver according to an exemplary embodiment of this invention.

A wireless office illustrated in FIG. 4 bases several different control decisions on signal strength. In a wireless office 410, PBX 412 connects calls between the wireless office 410 and the public switched telephone network (PSTN) 414. The PBX 412 is connected to a hub 416 by a plurality of lines 418. The hub 416 controls and coordinates communication in a coverage area 419 (similar in function to a base station in a cellular telephone system). The hub 416 uses a plurality of radio heads 420–423 to set up and maintain wireless communication within the office. Each radio head 420–423 has a number of transceivers (TRx) 430-1 through 430-N, 431-1 through 31-N, 432-1 through 432-N and 433-1 through 433-N, respectively. TRx's 430–433 provide the radio interface for wireless units, represented by wireless telephones 440 and 442 and wireless fax machine 444 in the coverage area 419. Each radio head 420–423 also includes a controller 450, 451, 452 and 453, respectively. The controllers 450–453 control their respective transceivers 430–433 and provide a communication interface between the transceivers 430–433 and the hub 416.

In this exemplary embodiment of a wireless office, scanning radio receivers (SRx) 460, 461, 462 and 463 are located at radio heads 420–423, respectively, to provide the hub 416 with information regarding radio channels. Such information includes the signal strength of the uplink (mobile to radio head) portion of a radio channel. The wireless units 440, 442 and 444 report signal strength on the downlink channel (radio head to mobile) as part of normal control operation. One or more optional downlink scanning radios 470 (shown in phantom) may also be used in the coverage area 419 so that hub 416 may monitor the downlink directly.

The hub 416 includes a controller 480 for controlling and coordinating the connections in a wireless office. Controller 480 operates on programs and data stored in memory 482. Controller 480 may be centralized or may comprise a plurality of processors for monitoring signal strength 484, for monitoring system integrity (for taking corrective action) 486 and for calculating 488.

The wireless office 410 employs several control algorithms that are based on signal strength measurements. Such algorithms include adaptive frequency allocation, mobile assisted handover, dynamic channel selection and dynamic radio head selection. All of these algorithms may be affected by a transmitter's noise. The corrective actions taken in the presence of transmitter noise that makes the signal strength measurements unreliable depends on the nature of the control function.

Figure 5:
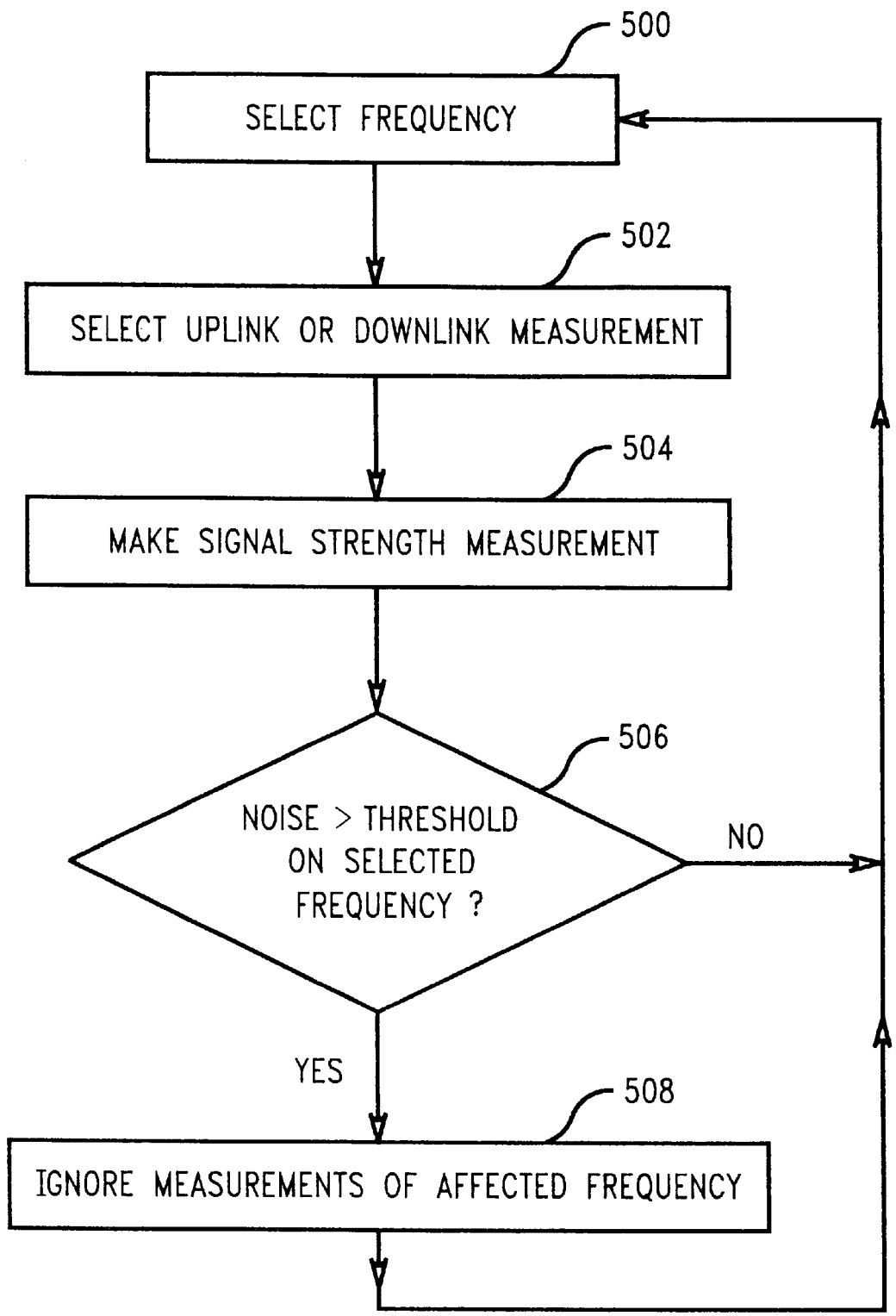
FIG. 5 is a flow diagram of adaptive frequency allocation that takes internal noise into account.

Adaptive frequency allocation selects and maintains the "best" set of radio frequencies for use within the wireless system. The "best" frequencies are those that have the least interference. The frequencies that have the least interference from transmitters external to the system on a long term (hours) basis and on all scanners (uplink and downlink) are selected and used. All channels within the frequency band are scanned periodically for interference, including the channels that are not currently on the list for use. FIG. 5 is a flow diagram of checking for internal noise. A frequency is selected in action box 500. Processing moves to action box 502 where an uplink or downlink signal strength measurement is selected. (Both uplink and downlink interference measurements are made for these determinations.) In action box 504, a signal strength measurement is made at the selected frequency.

In decision diamond 506, a determination is made whether any transmitter in the system is transmitting noise above a threshold on the selected frequency. If not, processing moves back to action box 500. If the noise is greater than the threshold on the selected frequency in decision diamond 506, then processing moves to action box 508 where the signal strength measurement of the affected frequency is ignored. In adaptive frequency allocation, the noise on frequencies is measured and averaged over a period of time (on the order of hours in this example). Therefore, noise, which is usually of a short duration, can be safely ignored for the duration of the noise.

Figure 6:
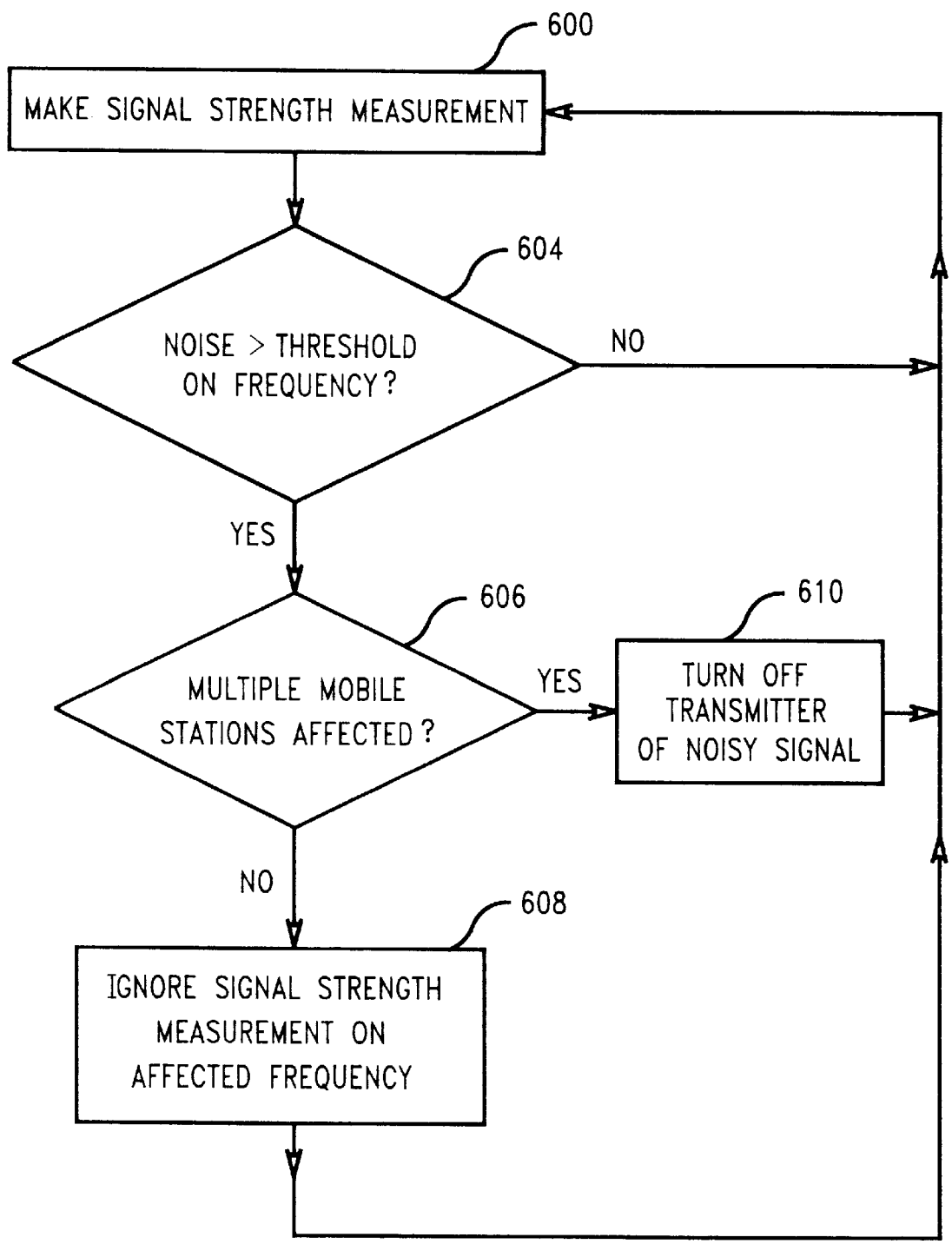
FIG. 6 is a flow diagram of mobile assisted handover that takes internal noise into account.

In a mobile assisted handoff, a mobile station makes signal strength measurement on its currently serving channel and other channels in the mobile station's vicinity. FIG. 6 is a flow diagram of handling internal noise in a mobile assisted handover. The mobile station makes its signal strength measurements in action box 600. In decision diamond 604, a determination is made whether any transmitter in the system is transmitting noise above a threshold on the selected frequency. If not, then processing moves back to action box 600. If the noise is greater than the threshold, then processing proceeds to decision diamond 606 where determination is made if multiple mobile stations are affected by the noise on the first frequency. If multiple mobile stations are not affected, then processing continues to action box 608 where the signal strength measurement of the affected frequency is ignored. Again, since noise is usually transient, it generally may be safely ignored for one or a few periodic signal strength measurements.

If, in decision diamond 606, multiple mobile stations are affected, then processing moves to action box 610 where the transmitter of the noisy signal is turned off. In this case, it is more desirable to lose one call than it is to affect a number of other mobile stations. Processing then loops back to action box 600.

Figure 7:
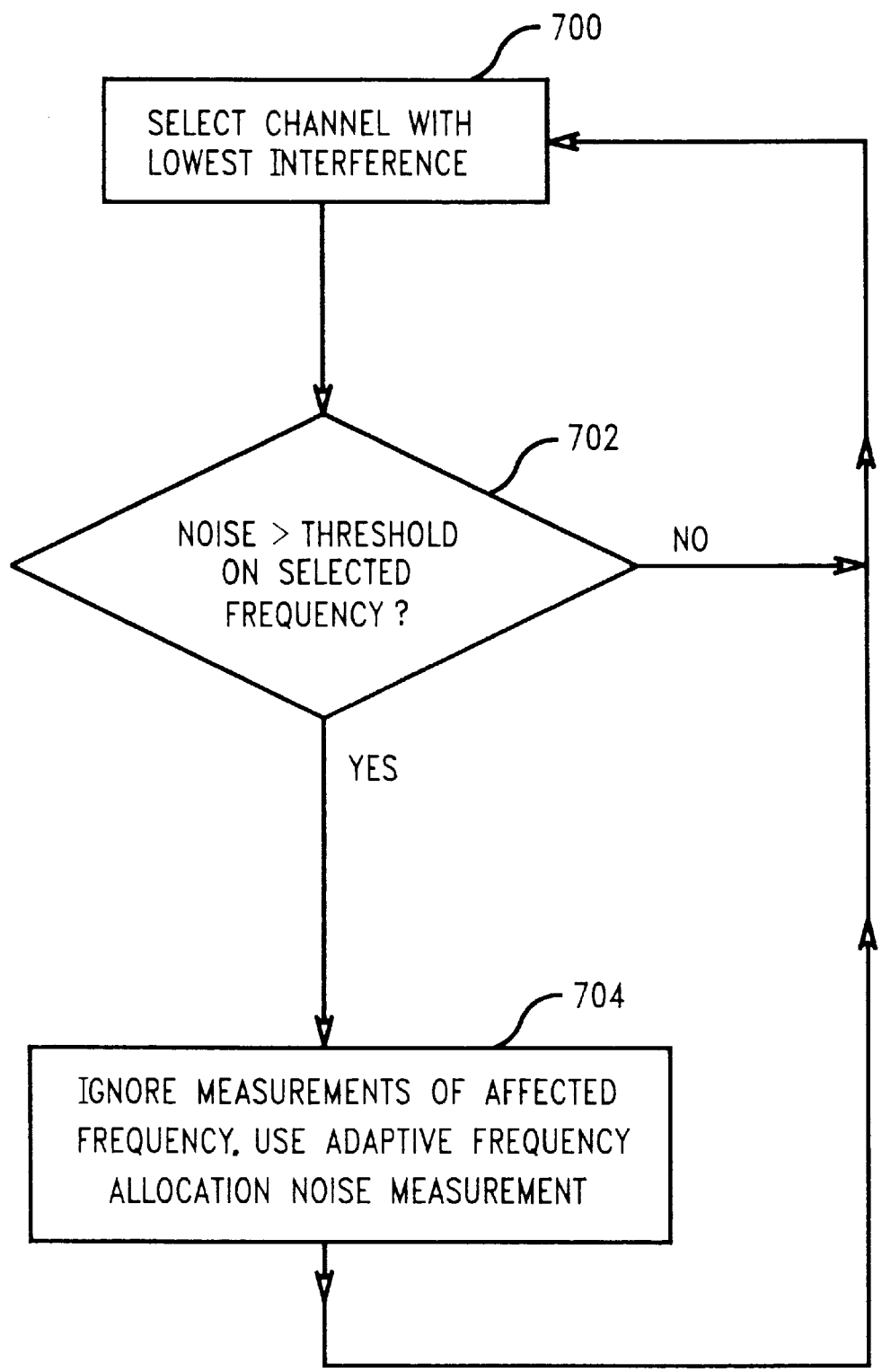
FIG. 7 is a flow diagram of dynamic channel selection that takes internal noise into account.

Dynamic channel selection selects the channel with the least interference for immediate allocation. FIG. 7 is a flow diagram of dynamic channel selection that takes internal noise into account. Processing starts in box 700 where a channel with the lowest short-term interference is selected. The short-term interference is determined by interference measurements filtered in a low-pass filter with a faster time constant than the filter used by the adaptive frequency allocation algorithm (above). In decision diamond 702, a determination is made whether the noise of a transmitter on another frequency is greater than a threshold on the selected frequency. If, in decision diamond 702, the noise is not greater than the threshold on the selected frequency, then the channel is allocated and processing moves back to action box 700.

If, in decision diamond 702, the noise is greater than the threshold on the selected frequency, then in action box 704 the measurement of the affected frequency can be safely ignored and the frequency measurements from adaptive frequency allocation may be used. In this case, it is not occupancy of the channel that is causing the noise, but a transient signal on another channel. Therefore, the measurement of the affected frequency can safely be ignored due to the usually transient nature of the noise.

Figure 8:
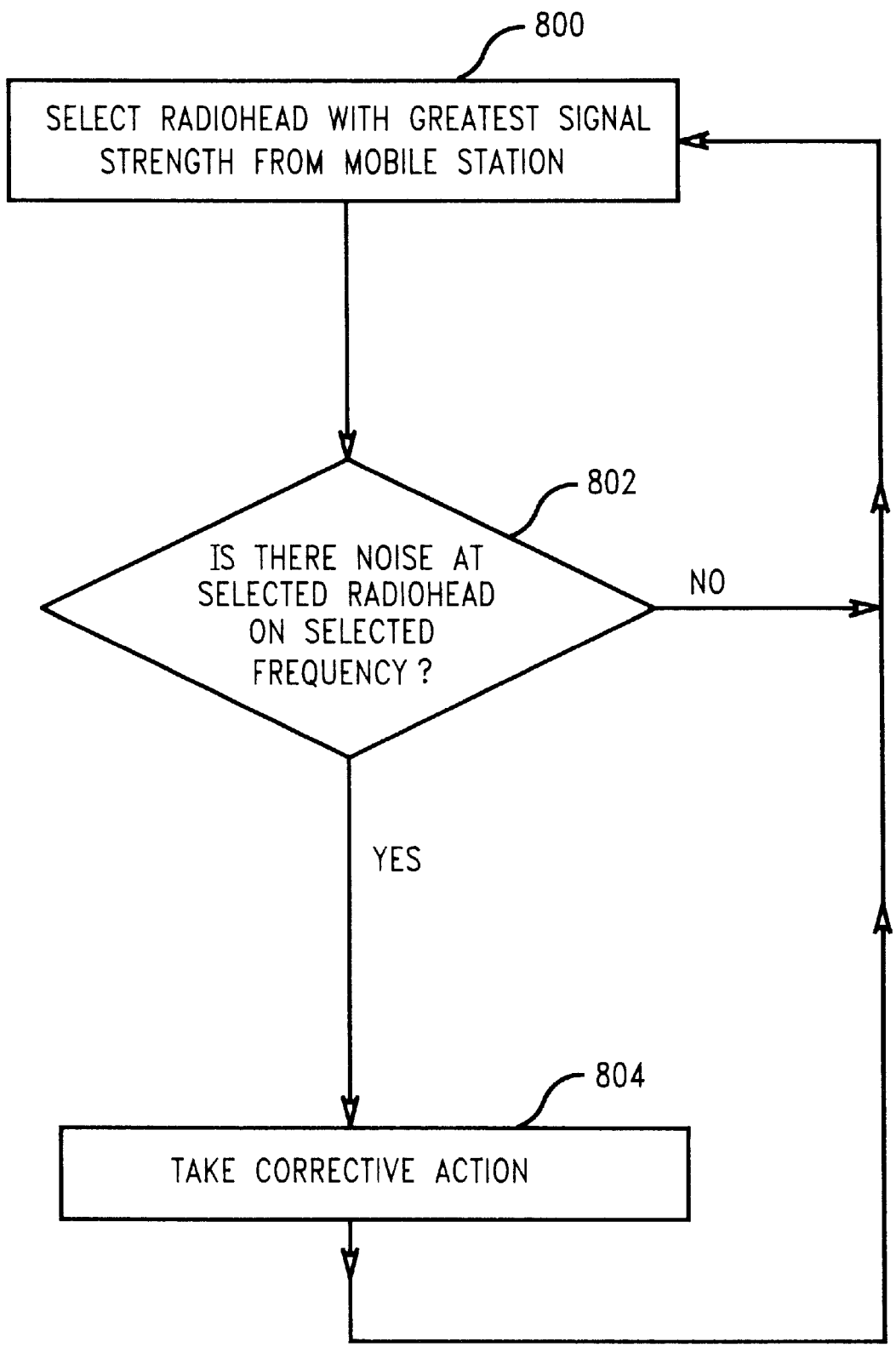
FIG. 8 is a flow diagram of dynamic radio head selection.

Dynamic radio head selection selects the radio head that is receiving the strongest signal from a mobile station as the radio head whose signal will be used in communication. A signal (e.g., from transmitter noise) on the mobile station's transmission channel on a radio head may fool the system and cause the system to select that radio head for communication with the mobile station. That radio head may have a false reading and may not be able to sustain the call. Therefore, in dynamic radio head selection that takes into account internal noise, as illustrated in FIG. 8, processing starts in box 800 with a radio head with the greatest signal strength from the mobile station is selected. A determination is then made in decision diamond 802 whether there is noise at the selected radio head on the selected frequency from a transmitter on another frequency. If there is not, then the allocation proceeds and processing returns to box 800. If there is noise at the selected radio head on the select frequency, then the processing proceeds to box 804 where corrective action is taken. Corrective action in this case includes, for example, not selecting a different radio head to sustain the call or possibly shutting down the transmitter of the noise. Additionally, the radio head may check the "color code" of the transmitter or check whether the transmitter is transmitting signals that are synchronized to the system.

Noise that originates external to the system may also be detected according to this invention, and corrective action may be taken. Transmission noise external to the system may be detected by the system if the characteristics of the transmission noise are known (the spectral energy pattern) and the system has some means to find the spectral energy pattern, for example, by signal strength scanners.

Figure 9:
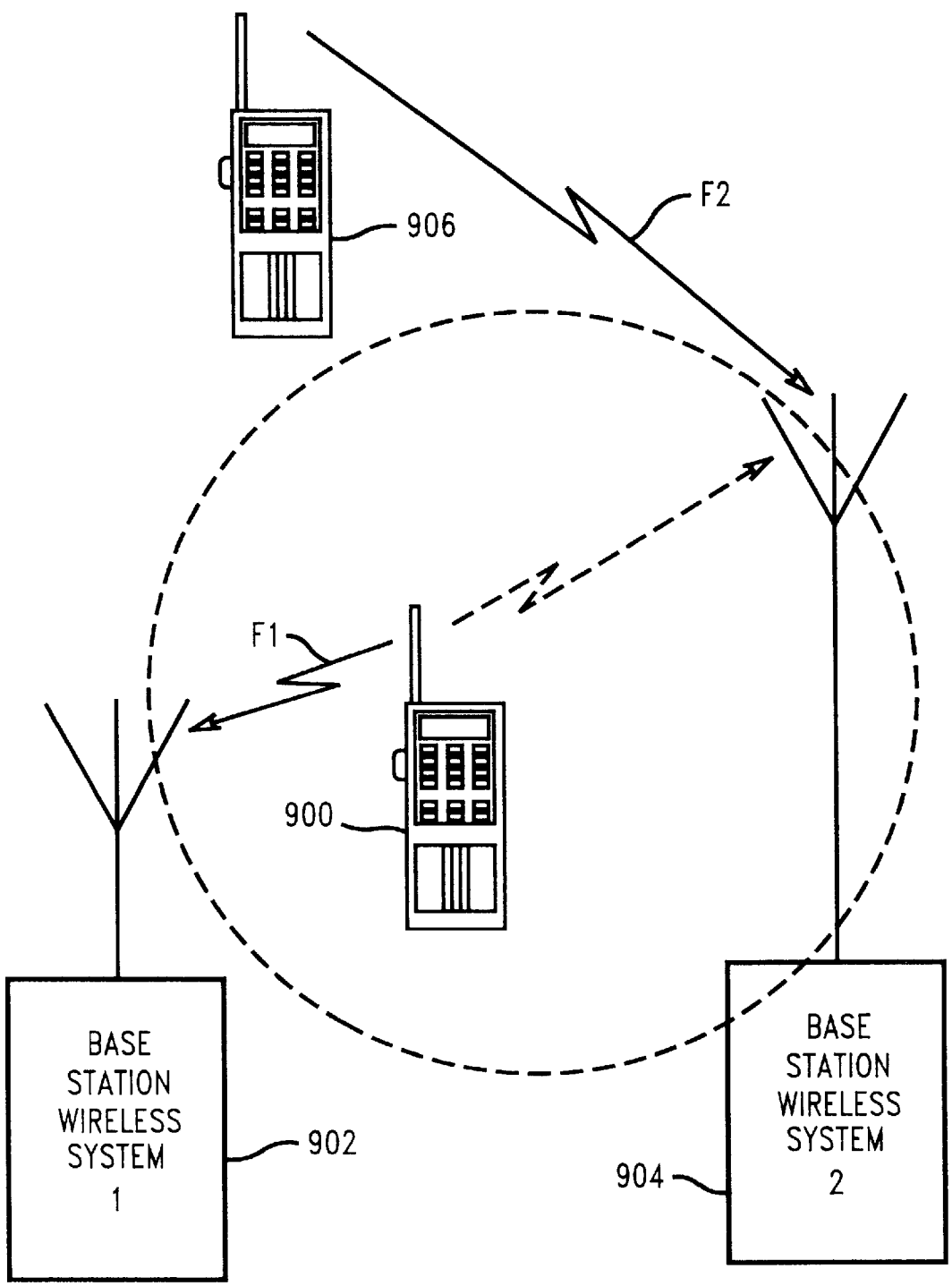
FIG. 9 is a block diagram of a wireless communication system subject to external transmitter noise.

FIG. 9 is a general example of a transmitter transmitting on one wireless network affecting signal strength measurements on another system. Mobile station 900 is transmitting a signal on a first frequency F1 to a base station 902 in a first wireless network. As is known in the art, mobile station 900 transmits omnidirectionally. Dashed-line circle represents the propagation of the signal of mobile station 900. The signal is received at base station 904 of wireless network 2. Mobile station 906 is operating in wireless network 2. Mobile station 906 is operating in another wireless network (wireless system 2). Two types of noise are possible in this scenario. First, mobile stations 900 and 906 may be assigned to the same channel, but in two different wireless networks. In this case, the base station 904 can distinguish between the two signals by checking the "color code" (DVCC) in the signal to determine whether the "color code" was assigned by that base station and/or whether the timing of the mobile station is synchronized to the network. When base station 904 determines that mobile station 900 is not operating in its wireless network (2), it can take corrective action in order to maintain communication with mobile station 906.

The second form of interference occurs when mobile stations 900 and 906 are operating on different channels. The signal from mobile station 900 may still interfere with the signal from mobile station 906. Transmitter noise from mobile station 900 may be received by base station 904. The side-lobes of a transmitted signal often have typical characteristic away from the center of the assigned frequency (e.g., Sinc, Bessel functions or flat and high noise, as known in the art). However, base station 904 may collect information regarding the signal transmitted by mobile station 900. An estimate of the signal energy as a function of frequency is found (the "spectral energy pattern") on the measured frequencies. If the correlation is higher than a threshold, corrective action can be taken depending on the severity of the noise.

Figure 10:
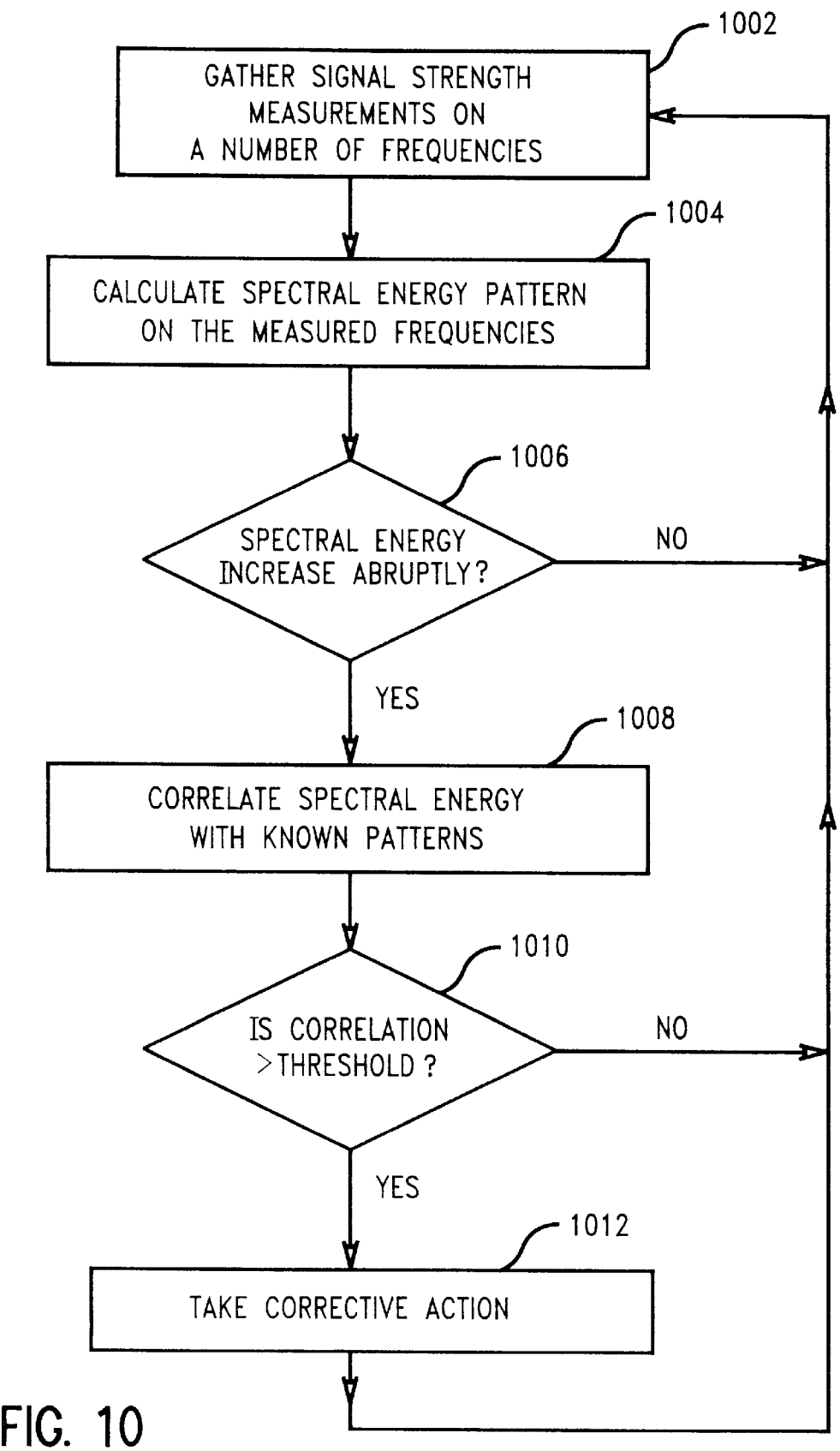
FIG. 10 is a flow diagram of determining the effects of noise from outside of the wireless communication system.

The general operation for detecting noise generated by a transmitter from a different wireless network is illustrated in the flow diagram of FIG. 10. Processing starts in action box 1002, where signal strength measurements are made on a number of frequencies, advantageously at a number of receivers. Processing moves to action box 1004, where the spectral energy pattern is calculated on the measured frequencies. A determination is made in decision diamond 1006 whether the spectral energy is increasing abruptly. If not, then processing loops back to box 1002. If the spectral energy is increasing abruptly, then processing continues to action box 1008.

When measuring noise from external sources, the base frequency is not known. Therefore, an entire or part of a spectral pattern is developed, and, in action box 1008, correlated with one or more known patterns. This step determines if the spectral pattern is similar to a known transmitter type. Next, in decision diamond 1010, a determination is made whether the correlation is above a threshold. If the correlation is not above a threshold, then processing loops back to action box 1002.

If, in decision diamond 1010, the correlation is above a threshold, then a transmitter from outside of the system is generating noise that is interfering with the system. Corrective action is taken in action box 1012. Such corrective action may include not using signal strength measurements from the receivers on the most affected frequencies and/or not using the affected frequencies, or other action. Processing then loops back to action box 1002.

Figure 11:
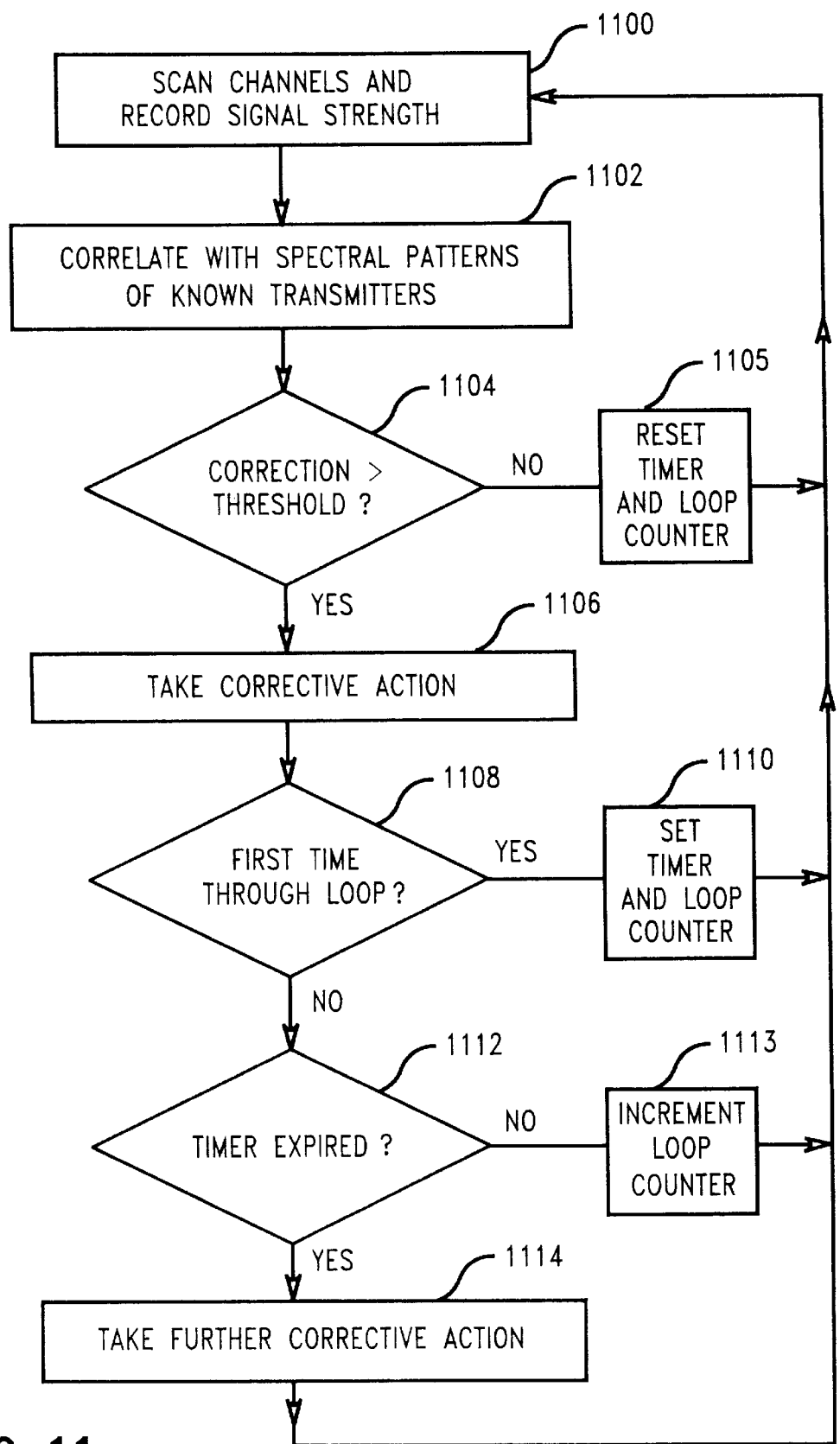
FIG. 11 is a flow diagram of adaptive frequency allocation that takes external noise into account.

Turning now to FIG. 11, a method for adaptive frequency allocation which takes into account external noise is shown. Processing starts in action box 1100 where the channels are scanned and signal strengths across the frequency spectrum of the system are recorded. Processing continues to action box 1102 where a correlation is made with the spectral patterns of known transmitters. This step determines whether the signal strength pattern across the frequencies is consistent with signal strength patterns from known transmitters outside the system. In decision diamond 1104, a determination is made whether the correlation is greater than a threshold for any of the known transmitters. If the correlation is not greater than the threshold, then both the timer and the loop counter (discussed below) are reset in action box 1105 and processing proceeds back to box 1100.

If, in decision diamond 1104, the correlation is above a threshold, then there is external noise affecting the functionality of the system and, thus, in action box 1106, corrective action is taken. Corrective action for external noise in adaptive frequency allocation may be skipping signal strength measurements on this channel or not allocating this channel for a period of time. Processing then proceeds to decision diamond 1108 where a determination is made if this is the first time through the loop. If it is the first time through the loop, then, in action box 1110, a timer and a loop iteration counter are set. In this manner, a determination can be made how long the interference is lasting.

If, in decision diamond 1108, it is not the first time through the loop, then a determination is made in decision diamond 1112 whether the timer has expired. If the timer has not expired yet, then the loop counter is incremented in action box 1113 and processing loops back to action box 1100. If the timer has expired, then further corrective action must be taken in action box 1114. Further corrective action may include such actions as permanently not allocating the affected channel or not allocating the affected channel for a longer period of time. Further, the set of channels may have to be redetermined at this point. Corrective action may also include manual action, such as negotiation between the operators of the internal and external transmitters.

Figure 12:
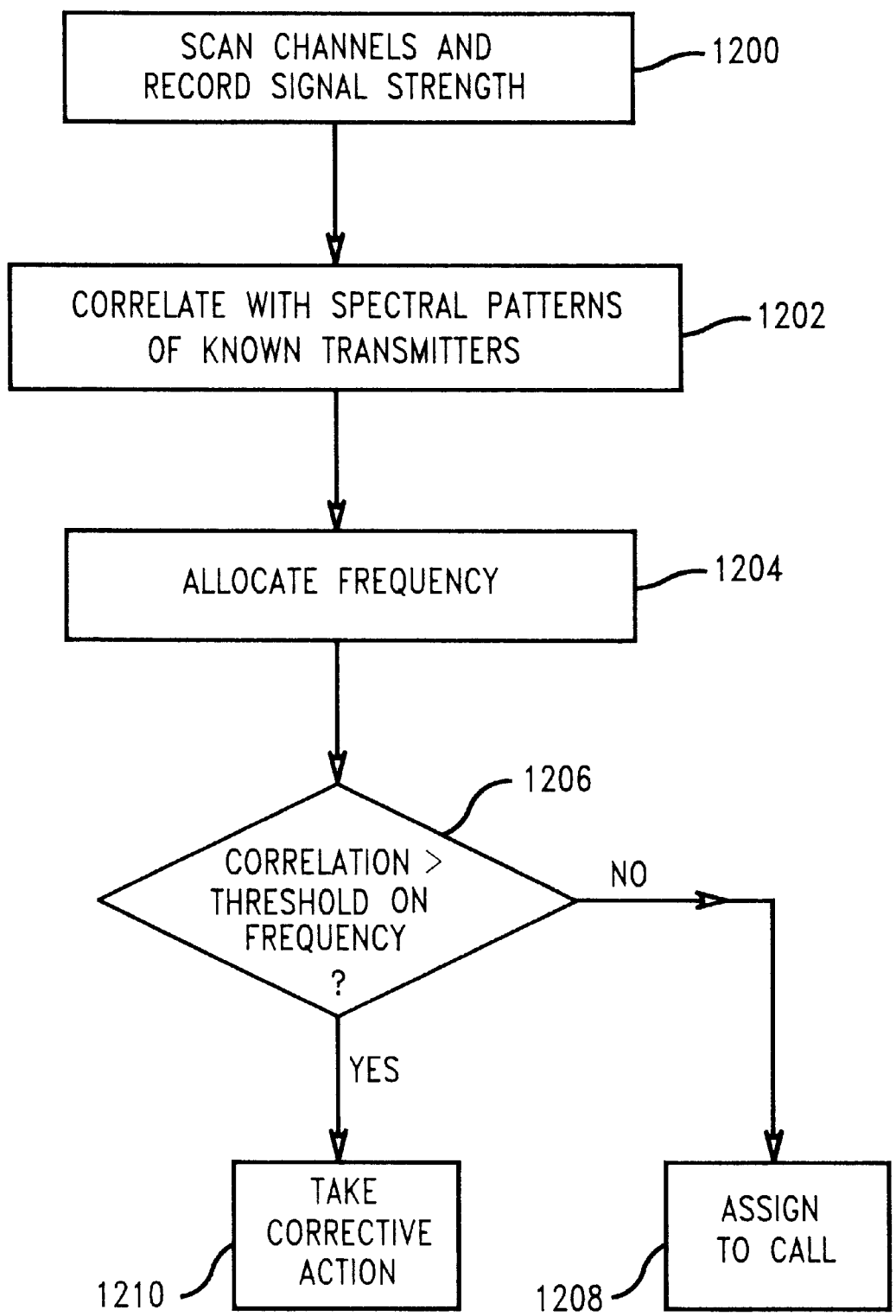
FIG. 12 is a flow diagram of dynamic frequency selection that takes external noise into account.

Turning now to FIG. 12, processing according to dynamic frequency allocation taking into account external noise is shown. Processing starts in action box 1200 where the channels are scanned and the signal strength is recorded. Processing moves to box 1202 where the signal strength across the frequency spectrum is correlated with spectral patterns of known transmitters. Processing continues to action box 1204 where a frequency is allocated for use. A decision is made in decision diamond 1206 whether the correlation is above a threshold on the allocated frequency. If the correlation is not above a threshold on the allocated frequency, then processing proceeds to action box 1208 where the frequency is assigned to the call. If, in decision diamond 1206, the correlation is greater than a threshold on the frequency, then processing continues to action box 1210 where corrective action is taken. Corrective action in this case could be allocation of another frequency, not measuring signal strength on this frequency for a time period, or removal of the frequency from the list of allocable frequencies.

Figure 13:
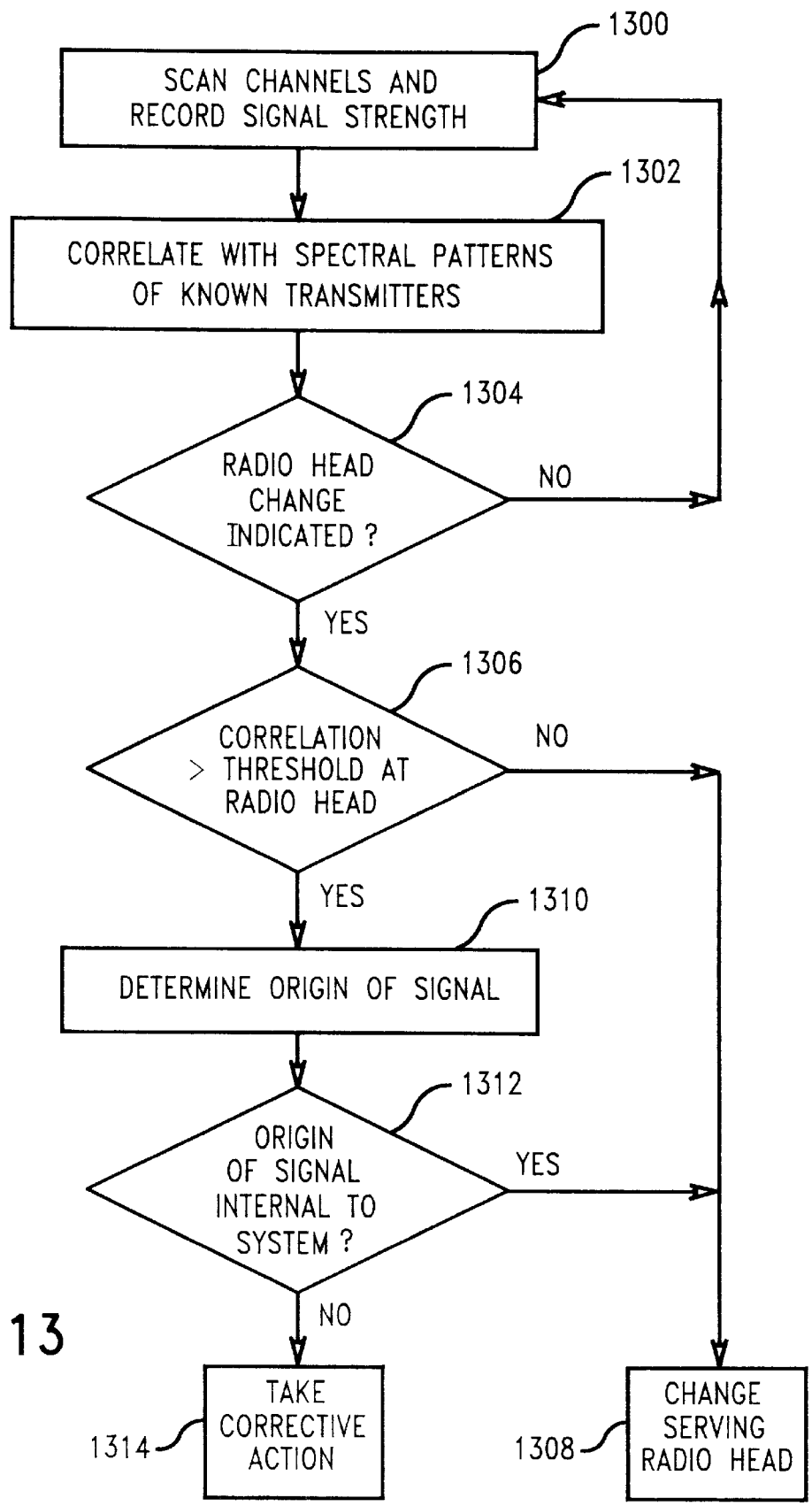
FIG. 13 is a flow diagram of dynamic radio head allocation that takes external noise into account.

Turning now to FIG. 13, processing for dynamic radio head selection taking into account external noise is shown. In action box 1300, the channels are scanned and the signal strengths are recorded across the frequencies. In action box 1302, the signal strengths across the frequencies are correlated with spectral patterns of known transmitters. A determination is made in decision diamond 1304 whether a radio head change is indicated for any of the mobile stations. If not, then processing returns to action box 1300.

If, in decision diamond 1304, a radio head change is indicated, then a determination is made if the correlation is greater than a threshold at the radio head in decision diamond 1306. If the correlation is not greater than the threshold, then processing proceeds to action box 1308 where the serving radio head is changed.

If, in decision diamond 1306, the correlation is greater than the threshold at the radio head, then processing moves to action box 1310 where a determination is made of the origin of the signal. This may be through decoding the color code or determining whether the transmission is aligned with the timing of the system. Processing continues to decision diamond 1312 where a determination is made whether the mobile is internal to the system. If it is, then processing continues to action box 1308 where the radio head is changed. If the transmitter is not internal to the system, then processing continues to action box 1314 for corrective action is taken. Such corrective action could include not measuring signal strength at that radio head on that frequency for a predetermined period of time, or not allocating that frequency either for a predetermined period of time or removing the frequency from the allocable list permanently.

It is to be understood that the above-described embodiment is to illustrate the principles of our invention, and that those skilled in the art may devise many variations without departing from the scope of the invention. It is, therefore, intended that such variations be included within the scope of the appended claims.

What is claimed is:

1. A method for minimizing effects of transmitter noise on signal strength measurements at a receiver in a wireless communication system that uses a plurality of frequencies for communication and that bases control decisions on signal strength measurements at the receiver, said wireless communication system having a transmitter transmitting a first signal at a first frequency and noise at other frequencies in a known pattern, said method comprising:

measuring the strength of the first signal at the first frequency at the receiver;

calculating noise from the transmitter at a second frequency from the measurement of the signal strength of the first signal at the first frequency and the known noise pattern of the transmitter; and taking corrective action if the calculated noise of the transmitter of the first signal is above a threshold at the second frequency.

2. The method of claim 1, wherein the corrective action comprises causing the transmitter to cease transmitting.

3. The method of claim 1, wherein the corrective action comprises disregarding signal strength measurements of the second frequency.

4. The method of claim 1, wherein said second frequency comprises a plurality of frequencies, and wherein the corrective action is taken if the noise of the transmitter is above a threshold on any of the plurality of frequencies.

5. A controller for use in a wireless communication system, said wireless communication system including a transmitter transmitting a first signal at a first frequency and noise at other frequencies in a known pattern and a receiver, said controller basing control decision on signal strength measurements received from the receiver, the controller comprising:
  a calculator configured to calculate noise from the transmitter at a second frequency from the measurement of the signal strength of the first signal at the first frequency and the known noise pattern of the transmitter; and
  a system integrity monitor configured to take corrective action when the calculated noise of the transmitter of the first signal is above a threshold at the second frequency.

6. The controller of claim 5, wherein the wireless communication receiver is configured to receive signals from a plurality of transmitters, each transmitting a signal on an assigned frequency and noise at other frequencies in a known pattern, said calculator being further configured to calculate noise from all of the plurality of transmitters from the measurement of the signal strength of the signals and the known noise patterns of the transmitter, said controller further comprising a memory configured to store frequencies affected by noise from one or more of the transmitters when the calculated noise is above a threshold.

7. The controller of claim 6, wherein said receiver comprises a plurality of receivers, and wherein said memory stores frequencies affected by noise at each of the receivers.

8. The controller of claim 7, wherein the controller allocates frequencies for communication, said controller being further configured to determine whether a frequency is affected by noise by examining the frequencies affected by noise in the memory before allocating the frequency.

9. The controller of claim 5, wherein the system integrity monitor is configured to stop the transmitter from transmitting when the transmitter noise is greater than a threshold.

10. The controller of claim 5, wherein the system integrity monitor is configured to stop the transmitter from transmitting when the transmitter noise is greater than a threshold for a predetermined time.

11. The controller of claim 5, wherein the system integrity monitor is configured to cause the controller to ignore signal strength measurements at the second frequency while the noise at the second frequency is greater than the threshold.

12. A method for adaptive frequency allocation in a wireless system having a plurality of transmitters transmitting to a plurality of receivers using a plurality of frequencies, said method comprising:
  (a) measuring a transmitted signal strength on one of said plurality of frequencies;
  (b) determining from the measured signal strength and the known spectral patterns of the transmitters whether one of the transmitters is transmitting a signal on another one of the frequencies and noise on the one frequency;
  (c) calculating whether the noise of the one transmitter is above a threshold on the one frequency; and
  (d) ignoring the signal strength measurement of the one frequency if the noise of the one transmitter is above the threshold.

13. The method of claim 12 further including the step of (e) repeating steps (a)–(d) for each of said plurality of frequencies.

14. A method of determining usable frequencies in a wireless system having a plurality of transmitters transmitting signals to a plurality of receivers on a plurality of frequencies comprising:

(a) measuring the signal strength of a first of said plurality of frequencies;
  (b) determining from the known spectral pattern of the transmitter of said first frequency a second frequency from the plurality of frequencies that is affected by the signal on said first frequency;
  (c) calculating the likely strength of the signal at the second frequency; and
  (d) listing the second frequency as unusable if the likely signal strength at the second frequency is above a threshold.

15. The method of claim 14 wherein
  step (b) comprises determining all of the frequencies that are affected by the signal;
  step (c) comprises calculating the likely strength of the signal at all of the frequencies determined in step (b); and
  step (d) comprises listing the frequencies where the signal strength is above a threshold as unusable.

16. The method of claim 15, wherein the wireless system assigns a different one of the frequencies to each of a plurality of transmitters, the method further including the step of (e) repeating steps (a)–(d) for each of the plurality of frequencies assigned to a transmitter.

17. In a wireless network having a plurality of spaced apart radio heads communicating with a first mobile station on a first frequency and a second mobile station transmitting on a second frequency, said radio heads connected to a controller, a method for dynamic radio head selection comprising:
  measuring the signal strength of a signal from the first mobile station at the radio heads;
  determining which radio head is receiving the signal with the greatest signal strength;
  determining whether the second mobile station is transmitting a second signal on another one of the frequencies and noise on the first frequency at the selected radio head and measuring the signal strength of the second signal;
  calculating from the signal strength of the second signal and the known noise pattern of the second mobile station whether the noise of the second mobile station is above a threshold on the first frequency at the selected radio head; and
  taking corrective action responsive to the noise being above the threshold.

18. The method of claim 17 wherein the corrective action comprises determining another radio head that is receiving the signal and is receiving noise below the threshold on the first frequency.

19. In a wireless system comprising a plurality of receivers and a plurality of transmitters transmitting on a plurality of frequencies, a method for determining transmitter noise from a transmitter outside of the wireless system comprising the steps of:
  collecting signal strength measurements from a receiver on a plurality of frequencies;
  estimating the spectral energy on the measured frequencies;
  correlating the estimated spectral energy with known spectral energy patterns;
  determining whether the correlation is greater than a threshold; and
  taking corrective action responsive to determining that the correlation is greater than the threshold.

20. The method of claim 19, wherein said corrective action comprises not allocating the frequency affected by the noise.

21. The method of claim 19, wherein the correlation is made over time, and wherein the step of determining whether the correlation is above a threshold comprises determining whether the correlation increased over a short period of time.

22. A wireless communication system capable of minimizing the effects of transmitter noise on signal strength measurements, said wireless communication system providing communication on a plurality of frequencies, said wireless communication system comprising:

a transmitter configured to transmit a first signal at a first one of said plurality of frequencies and noise at others of the plurality of frequencies in a known pattern;

a receiver configured to measure the signal strengths at the plurality of frequencies; and a controller configured to base control decisions on signal strength measurements, said controller including processor configured to receive the signal strength measurement of the first frequency from the receiver and calculating noise from the transmitter at others of said plurality of frequencies from the signal strength measurement and the known noise pattern, and means for taking corrective action responsive to the processor determining that the noise is above a threshold on one or more frequencies.

23. The wireless communication system of claim 22, wherein the controller further includes memory means for storing an identification of the frequencies with noise above a threshold.

24. The wireless communication system of claim 23, further including allocation means for assigning frequencies responsive to communication requests; said allocation means determining whether a selected frequency is allocable by determining whether the selected frequency is in the memory means.

25. The wireless communication system of claim 22, wherein the controller further includes means for turning off a transmitter when the noise is above a threshold on one or more frequencies.

26. The wireless communication system of claim 22, further including a plurality of transmitters and a plurality of signals, wherein said controller is configured to prevent noise above the predetermined threshold from interfering with another transmitter.

27. The wireless communication system of claim 22, further including a plurality of mobile stations, each mobile station comprising one of the plurality of transmitters and one of the plurality of receivers.

28. The wireless communication system of claim 22, further including a plurality of fixed radio heads, each of said radio heads including one or more of the plurality of transmitters and one or more of the plurality of receivers, and wherein each of said radio heads is connected to the controller.

29. A method for adaptive frequency allocation in a wireless system having a plurality of transmitters transmitting to a plurality of receivers using a plurality of allocable frequencies, said method comprising:

making transmitter signal strength measurements on the plurality of frequencies;

calculating a correlation of the transmitter signal strength measurements with known spectral patterns of transmitters external to the wireless system; and suspending measurement of signal strength frequencies affected by the transmitter external to the wireless system if the correlation is above a threshold.

30. The method of claim 29, further including the step of not allocating frequencies affected by the transmitter external to the system.

31. The method of claim 29, further including the step of timing the duration that the correlation is above a threshold and changing the plurality of allocable frequencies.

32. The method of claim 29, wherein the signal strength measurements are made at one of the plurality of receivers.

33. The method of claim 29, wherein the signal strength measurements are made at selected ones of the plurality of receivers.

34. The method of claim 29, wherein the signal strength measurements are made at all of the plurality of receivers.

35. A method for dynamic radio head selection for use in a wireless system having a plurality of spaced-apart radio heads and at least one mobile station, said mobile station communicating with one of said radio heads on one of a plurality of frequencies, said method comprising:

making signal strength measurements on the plurality of frequencies;

calculating a correlation of the signal strength measurements with known spectral patterns of transmitters external to the wireless system;

determining whether a radio head change is advantageous for said mobile station;

determining whether the correlation is greater than a threshold at the destination radio head;

changing the destination radio head responsive to determining that the signal is from the mobile station; and taking corrective action responsive to the signal being external to the system.

36. The method of claim 35, wherein determining that the signal is from the mobile station comprises determining whether a signal from the mobile station is synchronized to the system.

37. The method of claim 35, wherein the system assigns a color code to each mobile station within the system, and wherein determining that the signal is from the mobile station comprises determining whether the mobile station's color code was assigned by the system.

38. The method of claim 35, wherein the corrective action comprises temporarily suspending signal strength measurements at the destination radio head.

39. A wireless communication system capable of minimizing the effects of external transmitter noise on signal strength measurements, said wireless communication system providing communication on a plurality of frequencies, said wireless communication system comprising:

a receiver configured to measure the signal strength of a plurality of frequencies;

a controller configured to base control decisions on the signal strength measurements, said controller including a processor configured to receive signal strength measurements of the plurality of frequencies, to correlate the signal strength measurements with known spectral patterns of transmitters external to the system and to take corrective action responsive to the correlation being greater than a threshold.

40. The wireless communication system of claim 39, wherein the processor is further configured to take corrective action by determining one or more frequencies affected by the transmitter external to the system and not allocating the affected frequencies.

41. The wireless communication system of claim 39, further including a memory containing a list of allocable frequencies, and wherein said processor is further configured to take correction action by rebuilding the list in the memory.

42. The wireless communication system of claim 41, wherein said processor is further configured to take corrective action by timing how long the correlation is above the threshold and rebuilding the list when the correlation is above the threshold for a predetermined time.

43. The wireless communication system of claim 41, further including a memory configured to store a list of allocable frequencies, wherein the processor is further configured to take corrective action by determining the frequencies in the list of allocable frequencies affected by the transmitter external to the system and marking the affected frequencies in memory and not making signal strength measurements on the affected frequencies.

44. The wireless system of claim 43, wherein the processor is configured to rebuild the list of allocable frequencies responsive to one or more frequencies being marked for a predetermined time.

* * * * *